United States Patent [19]

Kendall

[11] 3,852,397
[45] Dec. 3, 1974

[54] PROCESS FOR THE SYNTHESIS OF BIS-N-PHOSPHORYLATED COMPOUNDS

[75] Inventor: Roger Vernon Kendall, Cranbury, N.J.

[73] Assignee: American Cyanamid Company, Stamford, Maine

[22] Filed: Feb. 22, 1973

[21] Appl. No.: 334,540

[52] U.S. Cl. ............ 260/968, 260/453 R, 260/926
[51] Int. Cl. ............................................. C07f 9/40
[58] Field of Search ................ 260/926, 968, 971

[56] References Cited
UNITED STATES PATENTS
3,705,211   12/1972   Addor et al. .................. 260/926

Primary Examiner—Lorraine A. Weinberger
Assistant Examiner—Richard L. Raymond
Attorney, Agent, or Firm—Jack W. Richards

[57] ABSTRACT

This invention relates to an improved process for the preparation of bis-N-phosphorylated compounds represented by the structure:

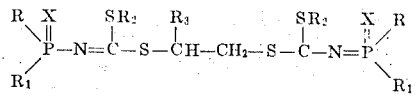

wherein R and $R_1$ are each members selected from the group consisting of alkyl $C_1$–$C_4$, alkoxy $C_1$–$C_4$ and phenyl; X is sulfur or oxygen; $R_2$ is alkyl $C_1$–$C_4$, alkenyl $C_1$–$C_4$, benzyl or halo-substituted benzyl; and $R_3$ is hydrogen or alkyl $C_1$–$C_4$. It is concerned with the preparation of those S,S'-disubstituted-S,S'-ethylene (or lower alkyl-substituted)-bis-phosphinylimido-dithiocarbonates which find utility as insecticides, arachnicides and anthelminics.

7 Claims, No Drawings

PROCESS FOR THE SYNTHESIS OF BIS-N-PHOSPHORYLATED COMPOUNDS

BACKGROUND OF THE INVENTION

The preparation of bis-N-phosphorylated compounds is described in U.S. Pat. No. 3,705,211. According to the U.S. Pat. No. 3,705,211, alkylene bis-phosphorylated imidodithiocarbonates can be prepared by treating a phosphinyl isothiocyanate with a salt of an alkylene dithiol. The thus-formed alkylene-bis-phosphinyl dithiocarbamate is then alkylated with an alkyl halide, alkenyl halide, benzyl halide or halo-substituted benzyl halide to obtain the desired alkylene-bis-phosphinylimido-dithiocarbonate.

Bis-N-phosphorylated compounds described in the U.S. Pat. No. 3,705,211 patent can be represented by the formula:

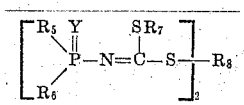

wherein $R_5$ and $R_6$ are members selected from the group consisting of lower alkyl, lower alkoxy and phenyl; Y is sulfur or oxygen; $R_7$ is lower alkyl, lower alkenyl, benzyl or halo-substituted benzyl; and $R_8$ is methylene, ethylene, lower alkyl-substituted ethylene, trimethylene, lower alkyl-substituted trimethylene, oxydimethylene, tetramethylene or lower alkyl-substituted tetramethylene.

According to the U.S. Pat. No. 3,705,211, alkylene bis-phosphorylated imidodithiocarbonates are prepared in two stages. In the first stage, a phosphinyl isothiocyanate of the formula:

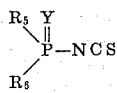

is reacted with the salt of an alkylene dithiol of the formula:

$$M-S-R_3-S-M$$

wherein $R_5$, $R_6$, $R_8$, and Y are as previously defined; and M is an alkali metal, such as sodium, potassium, or lithium or a trialkylammonium group, to form an alkylene-bis-phosphinyldithiocarbamate salt. Upon acidification the alkylene-bis-phosphinyldithiocarbamate thus-formed is recovered. Two moles of the isocyanate reactant are used per mole of the alkylene dithiol. However, an excess of the isocyanate can be used without seriously altering product yield. Advantageously, the reaction can be carried out over a wide range of temperatures, usually between about 0°C. and 100°C., but it is preferred to conduct the reaction at a temperature between about 50°C. and 30°C. Graphically, the over-all reaction in the first stage according to the U.S. Pat. No. 3,705,211 can be illustrated as follows:

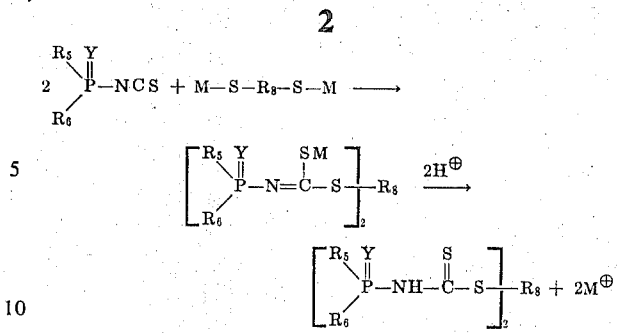

In the second stage, alkali metal or other salts, such as the trialkylammonium salt, of the above-identified alkylene-bis-phosphinyldithiocarbamates are then alkylated or otherwise reacted according to the U.S. Pat. No. 3,705,211 in accordance with the following illustrative over-all reaction:

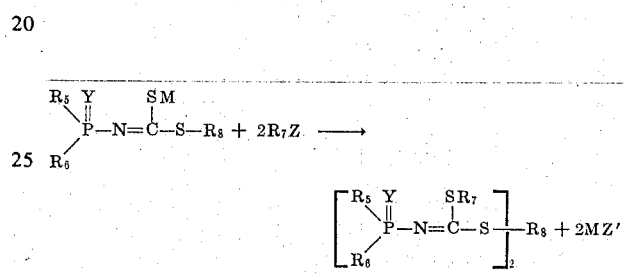

wherein $R_5$, $R_6$, $R_8$, Y and M are as previously defined; $R_7$ is lower alkyl, lower alkenyl (such as allyl or methallyl), benzyl or halo-substituted benzyl (such as 4-iodobenzyl), 2,4-dichlorobenzyl, 3,4,5-tribromobenzyl; and Z' is a halogen or a p-toluenesulfonate group to form the corresponding alkylene-bis-phosphinylimidodithiocarbonates. The reaction is preferably carried out with at least a two-mole ratio of the alkyl halide to the alkylene-bis-phosphinyldithiocarbamate salt. Alternatively, the acidification step in the first stage may be eliminated and the salt from the first step of stage 1 alkylated or otherwise reacted as in Stage 2 above.

Although the procedure in the U.S. Pat. No. 3,705,211 is effective for the preparation of the bis-N-phosphorylated compounds identified, the process described therein is not wholly satisfactory for the preparation of those compounds, wherein $R_8$ in the above formula is ethylene or lower alkyl-substituted ethylene. In practice, it has been found that in the preparation of the $R_8$ ethylene and lower alkyl-substituted ethylene compounds, in addition to the desired product, there are also several side reactions occurring which produce contaminating products. These contaminating products are unwanted and require separation from the desired product. To date, the only satisfactory method of separating contaminating products has been chromatography which is less than satisfactory for commercial production.

One example of the preparation sequence and side reactions that occur using the procedure in the U.S. Pat. No. 3,705,211 is illustrated below for the preparation of S,S'-dibenzyl-S,S'-ethylene (diethoxyphosphinyl) dithioimidocarbonate, a highly effective insecticidal, arachnicidal and anthelmintic agent.

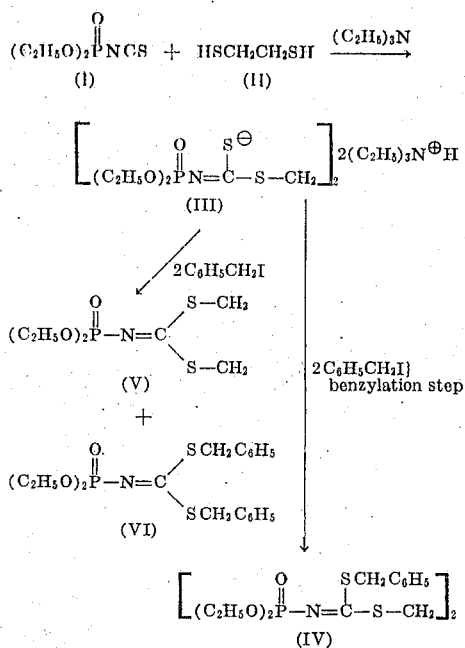

To separate the desired product, S,S'-dibenzyl-S,S'-ethylene (diethoxyphosphinyl) dithiocarbonate (IV) from the by-products (V and VI) in this reaction mixture, it is necessary to chromatograph the product, and the resultant yields are about 40 percent.

It is, therefore, an object of this invention to provide an improved process for the preparation of S,S'-disubstituted-S,S'-ethylene (or lower alkyl-substituted)-bis-phosphinylimidodithiocarbonates which does not require chromatography.

In attempting to achieve this objective, it was found that in the above preparation sequence the reaction of isothiocyanate (I) with the ethanedithiol (II) was a high yield reaction; however, the benzylation step was troublesome. To improve this step, the effects of the reaction variables were studied. The variables that proved most important were solvent, base, temperature and reaction time. Benzylation in solvents, such as tetrahydrofuran, benzene, ether and methanol were tried. The reaction was rapid in polar solvents, such as methanol, but unfortunately the product (IV) decomposed rapidly in the presence of base. A study of the affects of various bases such as $(C_2H_5)_3N$, $KOC(CH_3)_3$, $NaOH$, $KHCO_3$, $K_2CO_3$, $(C_2H_5)_2NH$ on the product (IV) in three different solvents (THF, methanol and benzene) showed that these bases would decompose the product to give the two by-products (V & VI). $K_2CO_3$ in tetrahydrofuran causes the least amount of decomposition.

Temperature variation had a profound affect on the course of the reaction. When benzylation was done at 0°C., the major reaction was the formation of the ring-closed by-product (V). This gave low yields of the desired product (IV), and the dibenzylated by-product (VI). At room temperature the benzylation was rapid, but so was the formation of both by-products (V & VI). Heating at 65°C. (i.e. refluxing in tetrahydrofuran) increased the amount of both by-products relative to the desired product. Moreover, it was found that long reaction times gave lower yields which appeared to be due to decomposition of the desired product in the presence of base.

The method that appeared most effective, but which was still unsatisfactory, was the benzylation of the intermediate, ethylene bis-(diethoxyphosphinyl) dithiocarbamate with benzyl iodide in tetrahydrofuran at room temperature using $K_2CO_3$ as the base. It appears that the low solubility of the $K_2CO_3$ in the tetrahydrofuran minimizes decomposition of the product.

Because the presence of base was found to decompose the product, a reaction system where the dianion could be generated without any excess base present would be ideal. This led to the concept of isolating the dimetal salt of the ethylene (diethoxyphosphinyl) dithiocarbamate and removing any excess base before the benzylation step of the synthesis. Various dimetal salts were tried and the salt which proved the easiest to obtain and purify was the dipotassium salt. The dipotassium salt was prepared in greater than 80 percent yield in acetone by reacting ethylene bis-(diethoxyphosphinyl dithiocarbamate with potassium t-butoxide. Other potassium alkoxides ($C_1$–$C_4$) and other metal hydroxides ($Na^+$, $K^+$, etc.) can be used in the preparation of the disalt. Besides acetone, the disalt can be prepared in other aprotic solvents such as acetonitrile nitromethane, glyme, diglyme, etc. Protic solvents such as alcohols ($C_1$–$C_4$) may also be used. On reaction with benzyl iodide in acetone, the dipotassium salt gave a 75 percent yield of crystalline product (i.e., S,S'-dibenzyl-S,S'-ethylene (diethoxyphosphinyl) dithioimidocarbonate (IV)). Benzyl bromide can also be used as the benzylating agent (see Example 3) without much loss in yield. On the other hand, benzyl chloride was found to give very little product. The benzylation reaction can be run in other aprotic solvents such as acetonitrile, nitromethane, glyme, diglyme, dichlorethane and other suitable ketones ($C_3$–$C_6$). A temperature range of 0° to 50°C. can be used for the reaction but a temperature range of 20° to 40°C. is preferred.

The concept of preparing the dipotassium salt free of any base and alkylating it with an excess of alkyl halide in an aprotic solvent proved to be the solution to the problem.

BRIEF SUMMARY OF THE INVENTION

This invention relates to a novel process for the preparation of bis-phosphorylated imidodithiocarbonate compounds represented by the structure:

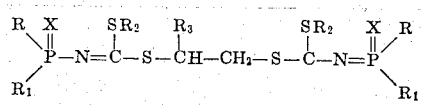

wherein R and $R_1$ each represent members selected from the group consisting of alkyl $C_1$–$C_4$, alkoxy $C_1$–$C_4$ and phenyl; X represents a member selected from sulfur and oxygen; $R_2$ represents a member selected from alkyl $C_1$–$C_4$, alkenyl $C_1$–$C_4$, benzyl or halo-substituted benzyl; and $R_3$ is hydrogen or alkyl $C_1$–$C_4$.

The bis-phosphorylated imidodithiocarbonates prepared according to this invention are highly effective anthelmintic agents, as set forth in U.S. Pat. No. 3,691,283, issued Sept. 12, 1972. They also find utility as insecticidal and arachnicidal agents and are very effective against both larval and adult stages of insects.

The process of this invention involves the preparation of compounds having the structure:

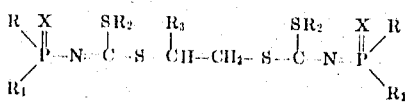

wherein R, $R_1$, $R_2$, $R_3$ and X are as described above which comprises the steps of (1) reacting a thiocyanate of the structure:

wherein R, $R_1$ and X are as described above; with a dithiol having the structure:

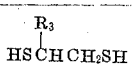

wherein $R_3$ is as described above. This reaction is preferably carried out at a temperature between about 0°C. and 40°C., in the presence of an inert solvent, preferably benzene, and an acid acceptor, such as triethylamine or trimethylamine. The reaction mixture is then treated with ethyl ether, followed by acidification with a mineral acid, preferably hydrochloric acid or sulfuric acid. The thus-formed product is then separated from the mixture as a solid or in solution with an organic phase, and has the structure:

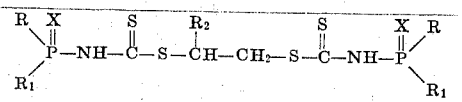

wherein R, $R_1$, X and $R_3$ are as described above; (2) reacting the thus-formed product with an alkali metal alkoxide $C_1$–$C_4$, preferably potassium t-butoxide, in the presence of an aprotic solvent, preferably acetone, and crystallizing out of said reaction mixture the dialkali (preferably the dipotassium) salt by the addition of a solvent of low polarity in which the salt is insoluble, preferably anhydrous ethyl ether, said separating from said treated reaction mixture the dialkali salt thus-formed which has the structure:

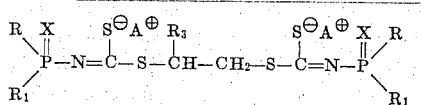

wherein R, $R_1$, X and $R_3$ are described above, and A is the alkali metal; and (3) treating said dialkali salt with an alkylating agent having the formula:

wherein $R_2$ is as described above, and Z is iodine or bromine.

By the term, "halo-substituted benzyl," is meant the ortho-, meta- or para-substituted mono-bromo, mono-iodo or mono-fluoro, di- and trichloro are also contemplated.

This invention resides in the process of preparing the dianion of the intermediate free of excess base and alkylating it in the absence of any excess base which decomposes the product. With this new method, benzyl bromides, but not benzyl chlorides, can be substituted for the more expensive benzyl iodides without significant loss in yield or purity of the final product.

Among the compounds prepared in accordance with the process of this invention are: imidocarbonic acid, (dipropoxyphosphinyl) dithio-, S,S'-dibenzyl S,S,'-ethylene ester; imidocarbonic acid, (diethoxyphosphinyl) dithio- S,S'-bis-(p-chlorobenzyl) S,S'-ethylene ester; imidocarbonic acid, (diethoxyphosphinothioyl)-dithio-, S,S'-dibenzyl S,S'-ethylene ester; imidocarbonic acid, (diisopropoxyphosphinyl)dithio-, S,S'-dibenzyl S,S'-ethylene ester; imidocarbonic acid, (diethoxyphosphinyl)-dithio-, S,S'-diethyl S,S'-ethylene ester; imidocarbonic acid, (diethoxyphosphinyl)dithio-, S,S'-ethylene C,S'-dimethyl ester; imidocarbonic acid, (diethoxyphosphinyl)dithio-, S,S'-dimethyl S,S'-methylethylene ester; imidocarbonic acid, (diethoxyphosphinyl) dithio-, S,S'-dibenzyl S,S'-ethylene ester; imidocarbonic acid, (diethoxyphosphinothioyl)dithio-, S,S'-ethylene S,S'-dimethyl ester.

DESCRIPTION OF PREFERRED EMBODIMENTS

The present invention is further illustrated by the following specific examples:

EXAMPLE 1

Preparation of Carbamic acid, (diethoxyphosphinyl)-dithio-, ethylene ester

A solution of ethane dithiol (200 grams, 2.1 moles) and triethylamine (420 grams, 2.4 moles) in 1.5 liters of benzene was stirred and maintained at about 5°C. by cooling in a Dry Ice/acetone bath while diethoxyphosphoryl isothiocyanate (105.5 grams, 4.3 moles) in toluene was added over a period of 20 minutes. After the addition was complete, the reaction mixture was stirred 1 hour at room temperature and then extracted with water (3 × 1 liter). The water extracts were combined, one liter of ethyl ether was added, and the mixture made acidic with 500 ml. of 12N HCl. The light yellow solid which precipitated was collected by filtration, washed with ethyl ether and air dried, yielding 696 grams (69 percent yield) of product, melting point 130°–133°C., which was sufficiently pure for use in the preparation of the imidocarbonic acid compound in Example 2.

EXAMPLE 2

Preparation of Imidocarbonic acid, (diethoxyphosphinyl)dithio-, S,S'-ethylene ester, S,S'-dipotassium salt To a solution of the carbamic acid, (diethoxyphosphinyl) dithio-, ethylene ester (485 grams, 1.0 mole), prepared in Example 1, in 1.5 liters of acetone, was slowly added potassium t-butoxide (224 grams, 2.0 moles). During the addition of the base an exotherm was noted. When the addition of the base was completed, the solution was then cooled in an ice bath and 2 liters of anhydrous ethyl ether was added. On cooling, the product precipitated from solution and was filtered and dried to yield 485 grams (87 percent yield) of the dipotassium salt, melting point 108°–110°C. The analytical sample, m.p. 110.0–110.5 was recrystallized from an ethanol — petroleum ether solution.

Anal. Calcd. for $C_{12}H_{24}N_2O_6S_4K_2P_2$: C, 25.70; H, 4.31; N, 4.99.
Found: C, 25.25; H, 4.45; N, 4.93.

EXAMPLE 3

Preparation of Imidocarbonic acid, (diethoxyphosphinyl) dithio-, S,S'-dibenzyl S,S'-ethylene ester The dipotassium salt (150 grams, 0.27 mole) prepared as in Example 2, was dissolved in one liter of acetone and benzyl bromide (100 grams, 0.57 mole) was added. After 20 minutes, the acetone was removed by evaporation and the resulting oil-solid mixture was partitioned between $CH_2Cl_2$ (800 milliliters) and a 5 percent sodium hydroxide solution (500 milliliters). The organic layer was separated, dried over $MgSO_4$ and the solvent evaporated. The resulting oil was triturated with 300 milliliters petroleum ether to remove the excess benzyl bromide. The petroleum ether extract was discarded. The oil was then dissolved in 800 ml. of anhydrous ethyl ether, seeded and cooled in an ice bath. After one hour, the resulting solid was filtered, giving 106 grams (60 percent yield) of product, melting point 61°C. to 64°C.

This reaction can be run using benzyl iodide which gives slightly higher yields. Benzyl chloride, on the other hand, gives very little product.

EXAMPLE 4

Preparation of Carbamic acid, (dimethoxyphosphinothionyl)dithio-ethylene ester

Ethanedithiol (0.9 gram, 0.01 mole) was dissolved with triethylamine (2.0 grams, 0.02 mole) in 15 ml. of benzene and to this cooled solution was slowly added the dimethoxyphosphinothionyl isothiocyanate (3.6 grams, 0.02 mole). The reaction mixture was allowed to stir at room temperature for 30 minutes and then was diluted with 50 ml. of benzene. After extraction with 50 ml. of water, the aqueous layer was separated, acidified with concentrated HCl, and extracted with ethyl ether. The ether solution was dried over $MgSO_4$ and evaporated, yielding 2.8 grams (61 percent) of yellow solid, melting point 94°C. to 98°C. The product was used, without recrystallization, to prepare the product of Example 5.

EXAMPLE 5

Preparation of Imidocarbonic acid, (dimethoxyphosphinothioyl)-dithio- S,S'-ethylene, S,S'-dibenzyl ester The carbamic acid, (dimethoxyphosphinothionyl) dithio-, ethylene ester (2.3 grams, 0.005 mole) prepared in Example 4 was dissolved in 15 milliliters of acetone and potassium t-butoxide (1.1 grams, 0.010 mole) was added. After a few minutes, 50 milliliters of anhydrous ethyl ether was added to the solution, causing the dipotassium salt to separate as an oil. The oil was separated by decanting the acetone — ethyl ether and then dissolved in 20 milliliter of fresh acetone. To this acetone solution was added benzyl bromide (2.0 grams, 0.012 moles); a precipitate formed immediately. The acetone was evaporated and the resulting residue was partitioned between methylene chloride (50 milliliters) and a 5 percent solution of sodium hydroxide (50 milliliters). The organic phase was separated, dried over $MgSO_4$, and evaporated to yield a clear oil. On dissolving the oil in 50 ml. of ethyl ether and cooling in an ice bath, the product crystallized. The white solid was filtered and dried to yield 1.3 grams (40 percent yield) of product. The analytical sample, melting point 89°–91°C., was recrystallized from methylene chloride — ethyl ether.

Anal. Calcd. for $C_{22}H_{30}N_2S_6O_4$: C, 41.20; H, 4.72; N, 4.37; S, 30.02.
Found: C, 41.20; H, 4.64; N, 4.26; S, 30.11.

As noted herein, the compounds prepared according to this invention have insecticidal activity.

Procedures for the Determination of Insecticidal Activity Southern Armyworm (*Prodenia eridania* Cramer)

Compounds to be tested are made up as 0.1 and 0.01 percent solutions or suspensions in 65 percent acetone/35 percent water mixtures. Sieva lima bean leaves are dipped in the test solutions and set in a hood on a screen to dry. When dry, each leaf is placed in four-inch petri dishes which have a moist filter paper in the bottom, and ten third-instar armyworm larvae about three-eighths inch long are added to each dish. The dishes are covered and held at 80°F., and 60 percent R.H. After 2 days, mortality counts and estimates of the amount of feeding are made. The results are reported in Table I below.

Bean Aphid (*Aphis fabae* Scopoli)

Compounds are tested as 0.1 percent, 0.01 and 0.001 percent solutions or suspensions in 65 percent acetone/35 percent water mixtures. 2-inch fiber pots, each containing a nasturtium plant 2 inches high and infested with about 150 aphids 2 days earlier, are sprayed with test solution to give complete coverage of the aphids and the plants. The sprayed plants are laid on their sides on white enamel trays which have had the edges coated with No. 50 SAE oil as a barrier. Mortality estimates are made after holding for 2 days at 70°F., and 50 percent R.H. The results are reported in Table I.

Two-spotted Spider Mite (*Tetranychus urticae* Kock)

Sieva lima bean plants with primary leaves 3 to 4 inches long are infested with about 100 adult mites per leaf 4 hours before use in this test. The mite-and egg-infested plants are dipped for 3 seconds in the 0.01 and 0.001 percent solutions used in the armyworm tests, and the plants set in the hood to dry. They are held for 2 days at 80°F., 60 percent R.H., and the adult mite mortality estimated on one leaf under a stereoscopic microscope. The other leaf is left on the plant an additional 5 days and then examined at 10X power to estimate the kill of eggs and of newly-hatched nymphs, giving a measure of ovicidal and residual action, respectively. The results are reported in Table I.

Systemic Tests

The compounds to be tested are formulated as emulsions containing 0.1 gram of test material, 0.2 gram of emulsifier, acetone, and water. This is diluted with sufficient water to give 100 ppm. and 10 ppm. emulsions. Sieva lima bean plants with only the primary leaves unfolded are cut off just above soil level and inserted into 2-ounce bottles of test emulsions and held in place by a bit of cotton wrapped around the stem. The bottles are then placed in a ventilated box with the leaves extending outside the box, such that any possible fumes from the compounds will be drawn out the end of the box rather than rising to affect the test leaves. About 50 adult two-spotted spider mites are placed on each leaf. After holding 3 days at 80°F. and 60 percent R.H., mortality estimates are made and one leaf from each plant is placed on a moist filter paper in the bottom of a petri dish. Ten third-instar southern armyworm larvae are added to each dish and mortality counts are made after holding another three days at 80°F. and 60 percent R.H. The results are reported in Table I.

Housefly (*Musca domestica Linnaeus*)

Groups of 25 adult female houseflies are lightly anesthetized with carbon dioxide, placed in wide-mouth pint mason jars, and covered with a screen cap. The test compound is formulated as an emulsion containing 50 ppm. or 5 ppm. of test material, an emulsifier, acetone and water. The mouth of the vial is covered with a single layer of cheesecloth, inverted and placed on the screen cap so that the flies can feed on the solution through the screen. Mortality counts are made after 2 days, at 80°F. The results are reported in Table I.

Southern Corn Rootworm (*Diabrotica undecimpunctata howardi Barber*)

The compound is formulated as a dust and incorporated into the soil at the equivalent of 50 pounds and 10 pounds per acre. The soil is sub-sampled into bottles, and ten 6- to 8-day-old rootworm larvae added to each bottle, which is then capped. Mortality counts are made after 6 days at 80°F., 60 percent R.H. The results are reported in Table I.

wherein R and $R_1$ is alkyl ($C_1$-$C_4$), alkoxy ($C_1$-$C_4$) or phenyl; X is sulfur or oxygen; $R_2$ is alkyl ($C_1$-$C_4$), alkenyl ($C_1$-$C_4$), benzyl or halo-substituted benzyl; and $R_3$ is hydrogen or alkyl ($C_1$-$C_4$), said process comprising the steps of:

1. reacting a thiocyanate of the structure

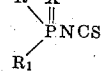

with a dithiol of the structure

in the presence of an inert solvent and acid acceptor at a temperature between 0° and 40°C.;

2. treating the thus-formed reaction mixture with ethyl ether followed by acidification with a mineral acid thereby obtaining the product of the structure

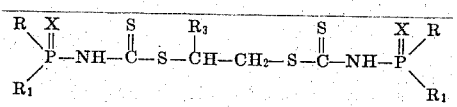

3. reacting the thus-formed product with an alkali metal alkoxide ($C_1$-$C_4$) in the presence of an aprotic solvent;

4. separating from the thus-formed reaction mixture a dialkali salt free of any excess base of the formula

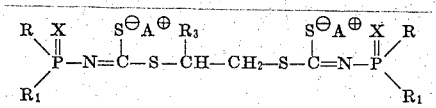

and

TABLE I

| Structure | Armyworm | | Aphids | | | Mites | | Systemics | | | | Housefly (p.p.m.) | | Rootworms, lbs./acre | |
|---|---|---|---|---|---|---|---|---|---|---|---|---|---|---|---|
| | | | | | | | | Mites (p.p.m.) | | Armyworms (p.p.m.) | | | | | |
| | 0.1% | 0.01% | 0.1% | 0.01% | 0.001% | 0.01% | 0.001% | 100 | 10 | 100 | 10 | 50 | 5 | 50 | 10 |
| $[(C_2H_5O)_2\overset{O}{\overset{\|}{P}}-N=\overset{SCH_3}{\overset{\|}{C}}-S-CH_2-]_2$ | 100 | 100 | 100 | 90 | 0 | 100 | 0 | 100 | 100 | 100 | 100 | 100 | 72 | 50 | 0 |
| $[(C_2H_5O)_2\overset{S}{\overset{\|}{P}}-N=\overset{SCH_3}{\overset{\|}{C}}-S-CH_2-]_2$ | 100 | 100 | 0 | | | 0 | | 0 | | 0 | | 20 | 0 | 100 | 40 |
| $(C_2H_5O)_2\overset{O}{\overset{\|}{P}}-N=\overset{SCH_3CH}{\overset{\|}{C}}-S-CH$ $(C_2H_5O)_2\overset{O}{\overset{\|}{P}}-N=\overset{SCH_3}{\overset{\|}{C}}-S-CH_2$ | 100 | 100 | 100 | 90 | 0 | 100 | 0 | 100 | 95 | 100 | 100 | 100 | 100 | 35 | 0 |
| $[(C_2H_5O)_2\overset{O}{\overset{\|}{P}}-N=\overset{SC_2H_5}{\overset{\|}{C}}-S-CH_2-]_2$ | 100 | 100 | 100 | 98 | 0 | 100 | 0 | 100 | 86 | 100 | 100 | 0 | | 100 | 60 |
| $[(C_2H_5O)_2\overset{O}{\overset{\|}{P}}-N=\overset{SCH_2C_6H_5}{\overset{\|}{C}}-S-CH_2-]_2$ | 100 | 100 | 100 | 80 | 0 | 98 | 0 | 100 | 90 | 100 | 100 | 100 | 84 | 100 | 40 |
| $[(n\text{-}C_3H_7O)_2\overset{O}{\overset{\|}{P}}-N=\overset{S-CH_2C_6H_5}{\overset{\|}{C}}-SCH_2-]_2$ | 100 | 100 | 100 | 90 | 0 | 90 | 0 | 100 | 50 | 100 | 0 | 56 | 0 | 100 | 0 |
| $[(C_2H_5O)_2\overset{O}{\overset{\|}{P}}-N=\overset{S-CH_2C_6H_4Cl}{\overset{\|}{C}}-SCH_2-]_2$ | 100 | 100 | 100 | 95 | 20 | 69 | 0 | 90 | 44 | 100 | 70 | 100 | 0 | 100 | 80 |
| $[(C_2H_5O)_2\overset{S}{\overset{\|}{P}}-N=\overset{S-CH_2C_6H_5}{\overset{\|}{C}}-SCH_2-]_2$ | 100 | 0 | 25 | | | 0 | | 0 | | 30 | | 100 | 0 | 100 | 35 |
| $[(i\text{-}C_3H_7O)_2\overset{O}{\overset{\|}{P}}-N=\overset{S-CH_2C_6H_5}{\overset{\|}{C}}-SCH_2-]_2$ | 100 | 0 | 100 | 98 | 50 | 0 | 0 | 0 | | 0 | | 100 | 0 | 100 | 90 |

I claim:

1. A process for the preparation of bis-N-phosphorylated compounds of the formula:

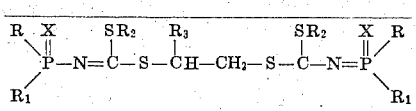

5. treating said dialkali salt in an aprotic solvent at a temperature of 0° to 50°C. with an excess of alkylating agent of the formula $$R_2Z$$

wherein A is the alkali metal; and Z is iodine or bromine.

2. A method according to claim 1, wherein R and $R_1$ are alkoxy $C_1$–$C_4$; X is oxygen; $R_2$ is alkyl $C_1$–$C_4$; and $R_3$ is hydrogen.

3. A method according to claim 1, wherein R and $R_1$ are alkoxy $C_1$–$C_4$; X is oxygen; $R_2$ is benzyl; and $R_3$ is hydrogen.

4. A method according to claim 1, wherein R and $R_1$ are alkoxy $C_1$–$C_4$; X is sulfur; $R_2$ is alkyl; and $R_3$ is hydrogen.

5. A method according to claim 1, wherein R and $R_1$ are alkoxy $C_1$–$C_4$; X is sulfur; $R_2$ is benzyl; and $R_3$ is hydrogen.

6. A method according to claim 1 wherein the inert solvent is benzene; the acid acceptor is triethylamine; the mineral acid is hydrochloride acid; the alkali metal alkoxide is a potassium alkoxide; the aprotic solvent is acetone; and Z is iodine.

7. A method according to claim 1 which comprises separating the dialkali salt from the reaction mixture as a solid product.

* * * * *